(No Model.)

M. BROWN.
SAW.

No. 324,357. Patented Aug. 18, 1885.

Witnesses:
Wm A. Rosenbaum
J. P. Town

Inventor
Mathew Brown
by V. D. Stockbridge
Atty.

UNITED STATES PATENT OFFICE.

MATHEW BROWN, OF BRIDGEPORT, CONNECTICUT, ASSIGNOR OF ONE-HALF TO ADIN M. BARBER, OF SAME PLACE.

SAW.

SPECIFICATION forming part of Letters Patent No. 324,357, dated August 18, 1885.

Application filed January 13, 1885. (No model.)

*To all whom it may concern:*

Be it known that I, MATHEW BROWN, a citizen of the United States, residing at Bridgeport, in the county of Fairfield and State of Connecticut, have invented certain new and useful Improvements in Hack-Saws; and I do hereby declare the following to be a full, clear, and exact description of the invention, such as will enable others skilled in the art to which it appertains to make and use the same.

My invention relates to hack-saws, and its object is to produce them of superior quality at the smallest possible cost; and to this end my invention consists, essentially, in a saw having small teeth gradually widened toward their cutting-edges to make such edges longer than the thickness of the plate from which the saw is made.

Figure 1:
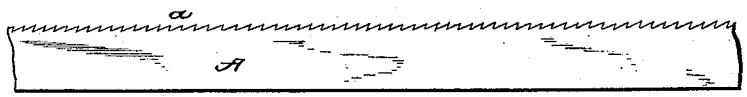
Figure 2:
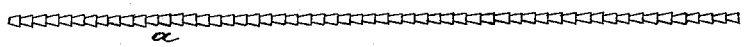
Figure 2:
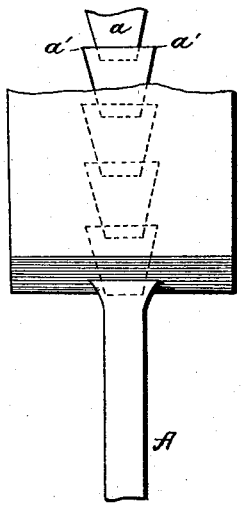
Figure 3:
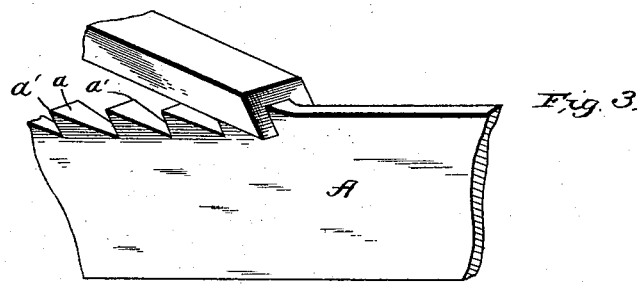

In the drawings, Figure 1 is a side and edge elevation of my improved saw. Fig. 2 is an enlarged edge view of a segment of a saw with a segment of a tooth-cutting tool in elevation. Fig. 3 is a perspective showing an enlarged view of a segment of saw and tool.

A is the saw-plate, and $a$ $a$ are the teeth, whose faces are substantially in the form of a dovetail, whose points $a'$ $a'$ project beyond the plane of the sides of the plate.

I take a plate of soft steel and cut the teeth with a chisel or other suitable tool, as shown in Figs. 2 and 3. This causes the metal at the edges of the teeth to flow or spread to the form shown. I afterward temper the same, and the saw is complete and ready for use.

I have discovered that hack-saws made in the manner and having teeth of the form and character above described are superior in use to those having "set" teeth, or teeth alternately projecting to the right and left of the plane of the saw-plate, and that the same are more easily and cheaply made.

I am aware that it is not new to provide large saw-teeth with edges wider than the thickness of the plate from which the saw is made. In such cases, however, the widened part ends abruptly, and leaves the body of the teeth of the thickness of the saw-plate. I therefore do not claim, broadly, saw-teeth having cutting-edges wider than the thickness of the saw-plate; but,

Having thus fully described my invention, what I claim, and desire to secure by Letters Patent, is—

A saw having small teeth gradually widened from their bases to their cutting-edges, substantially as described.

In testimony whereof I affix my signature in presence of two witnesses.

MATHEW BROWN.

Witnesses:
GEO. F. ATHERTON,
WM. H. KELSEY.